(12) United States Patent
Hartman et al.

(10) Patent No.: US 7,530,622 B2
(45) Date of Patent: May 12, 2009

(54) APPARATUS AND METHOD FOR POSITIONING A TARPAULIN

(75) Inventors: Jerry Franklin Hartman, Denton, NC (US); Sammy Lee Barringer, Denton, NC (US); Larry Edward Hamilton, Lexington, NC (US)

(73) Assignee: Lowe's Companies, Inc., Mooresville, NC (US)

( * ) Notice: Subject to any disclaimer, the term of this patent is extended or adjusted under 35 U.S.C. 154(b) by 0 days.

(21) Appl. No.: 11/940,712

(22) Filed: Nov. 15, 2007

(65) Prior Publication Data

US 2008/0129074 A1   Jun. 5, 2008

Related U.S. Application Data

(62) Division of application No. 11/026,332, filed on Dec. 30, 2004, now Pat. No. 7,182,387.

(51) Int. Cl.
*B60P 7/02* (2006.01)

(52) U.S. Cl. .................................. 296/100.16
(58) Field of Classification Search ............ 296/100.12, 296/98, 36, 100.15, 100.16, 100.11; 294/84.1
See application file for complete search history.

(56) References Cited

U.S. PATENT DOCUMENTS

| | | | | |
|---|---|---|---|---|
| 2,969,255 | A | | 1/1961 | Nystrom |
| 3,204,798 | A | | 9/1965 | Becker |
| 3,628,826 | A | | 12/1971 | Sibley |
| 3,841,697 | A | | 10/1974 | McFarland |
| 3,870,180 | A | * | 3/1975 | Snelling, Jr. ............... 414/608 |
| 4,044,963 | A | * | 8/1977 | Hostetler ................ 414/24.6 |
| 4,070,047 | A | | 1/1978 | Lindelöw |
| 4,084,763 | A | * | 4/1978 | Zamboni ................. 242/393 |
| 4,095,840 | A | | 6/1978 | Woodard |
| 4,179,080 | A | * | 12/1979 | Patnaude ................ 242/403.1 |
| 4,253,619 | A | * | 3/1981 | Corderoy et al. ......... 242/390.6 |
| 4,342,480 | A | | 8/1982 | Ross, Jr. |
| 4,555,073 | A | * | 11/1985 | Barazone .................. 242/557 |
| 4,720,212 | A | * | 1/1988 | Steenbergen et al. ....... 405/176 |
| 4,828,432 | A | * | 5/1989 | Ives .......................... 405/270 |
| 4,842,323 | A | | 6/1989 | Trickett |
| 4,856,843 | A | | 8/1989 | Elliott |

(Continued)

OTHER PUBLICATIONS

Declarations of Sammy Lee Barringer dated Jun. 9, 2006, Larry Edward Hamilton dated Jun. 9, 2006, and Jerry Franklin Hartman dated Jun. 7, 2006, relating to the development of the Tarpaulin Apparatus; 20 pages.

*Primary Examiner*—Kiran B. Patel
(74) *Attorney, Agent, or Firm*—Moore & Van Alen; W. Kevin Ransom

(57) ABSTRACT

A system for positioning a tarpaulin on a flatbed is provided. According to one embodiment, the system comprises a lifting device and a tarpaulin positioning apparatus structured to be attached to the lifting device. The lifting device is structured to lift at least a portion of the tarpaulin positioning apparatus above the flatbed and to move the portion of the tarpaulin positioning apparatus over the length of the flatbed from one end to the other. The tarpaulin positioning apparatus is further structured to deploy the tarpaulin on the flatbed as the portion of the tarpaulin positioning apparatus is moved over the length of the flatbed from one end to the other by the lifting device.

4 Claims, 10 Drawing Sheets

U.S. PATENT DOCUMENTS

| | | | |
|---|---|---|---|
| 4,927,317 A | 5/1990 | Acosta | |
| 4,991,522 A | 2/1991 | Alexander | |
| 4,998,398 A | 3/1991 | Compton | |
| 5,007,672 A | 4/1991 | Koch | |
| 5,256,023 A | 10/1993 | Patrick et al. | |
| 5,292,169 A | 3/1994 | O'Brien | |
| 5,304,014 A * | 4/1994 | Slutz | 405/129.9 |
| 5,336,036 A * | 8/1994 | Williamson et al. | 414/502 |
| 5,338,084 A | 8/1994 | Wardell | |
| 5,388,882 A | 2/1995 | Russell et al. | |
| 5,713,712 A | 2/1998 | McIntyre | |
| 5,829,818 A | 11/1998 | O'Daniel | |
| 5,964,236 A | 10/1999 | Berke | |
| 5,988,732 A | 11/1999 | Schouten | |
| 6,196,604 B1 | 3/2001 | Hoh et al. | |
| D445,396 S | 7/2001 | Wood | |
| 6,264,400 B1 * | 7/2001 | Gent | 405/129.75 |
| 6,575,393 B1 * | 6/2003 | James, Jr. | 242/390 |
| 6,634,850 B2 | 10/2003 | Christensen | |
| 6,779,828 B1 | 8/2004 | Poyntz | |
| 6,786,446 B1 * | 9/2004 | Kaul et al. | 242/557 |
| 6,811,202 B2 * | 11/2004 | Hornady | 296/100.01 |
| 6,974,176 B2 | 12/2005 | Smith et al. | |
| 7,018,135 B2 * | 3/2006 | Kaul et al. | 405/129.75 |
| 7,188,447 B2 * | 3/2007 | Rose et al. | 47/32.2 |
| 7,389,957 B1 * | 6/2008 | Struksnes | 242/403 |

* cited by examiner

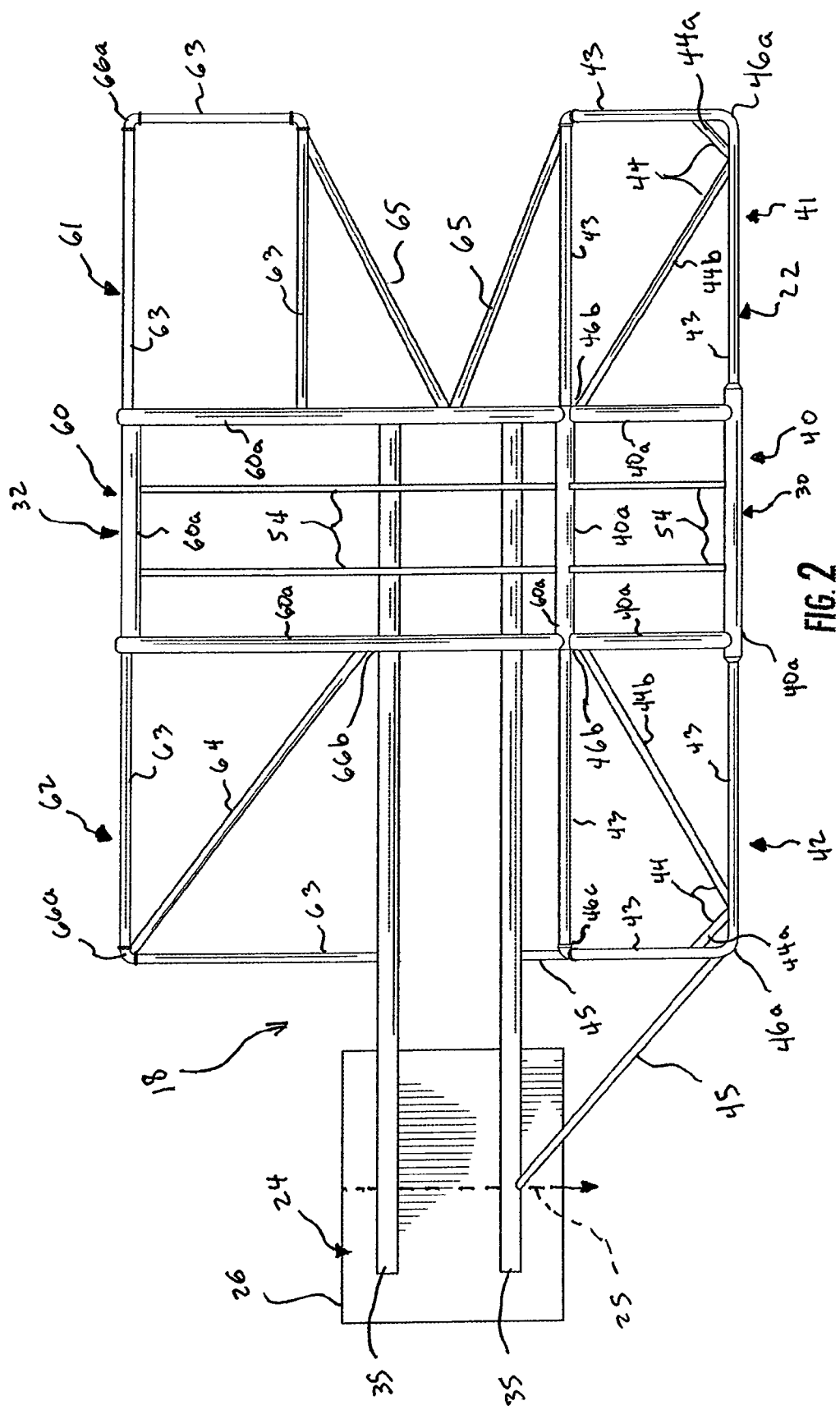

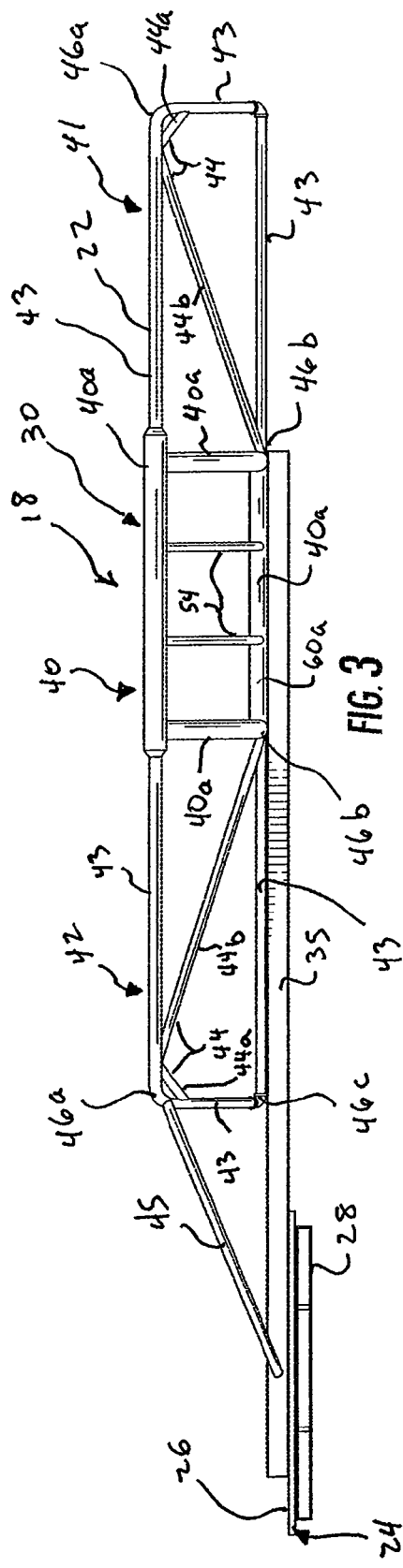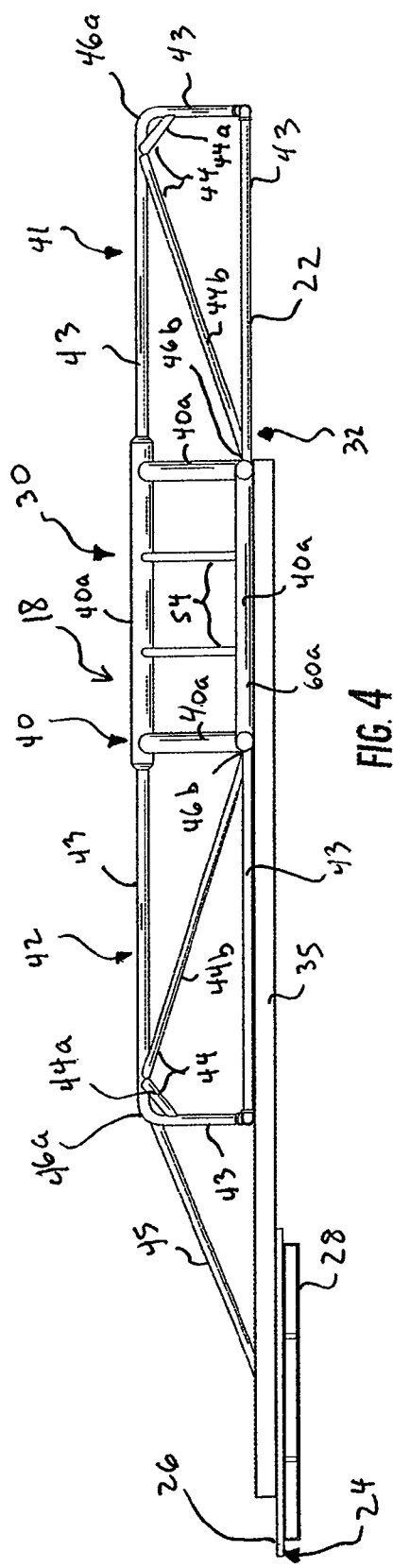

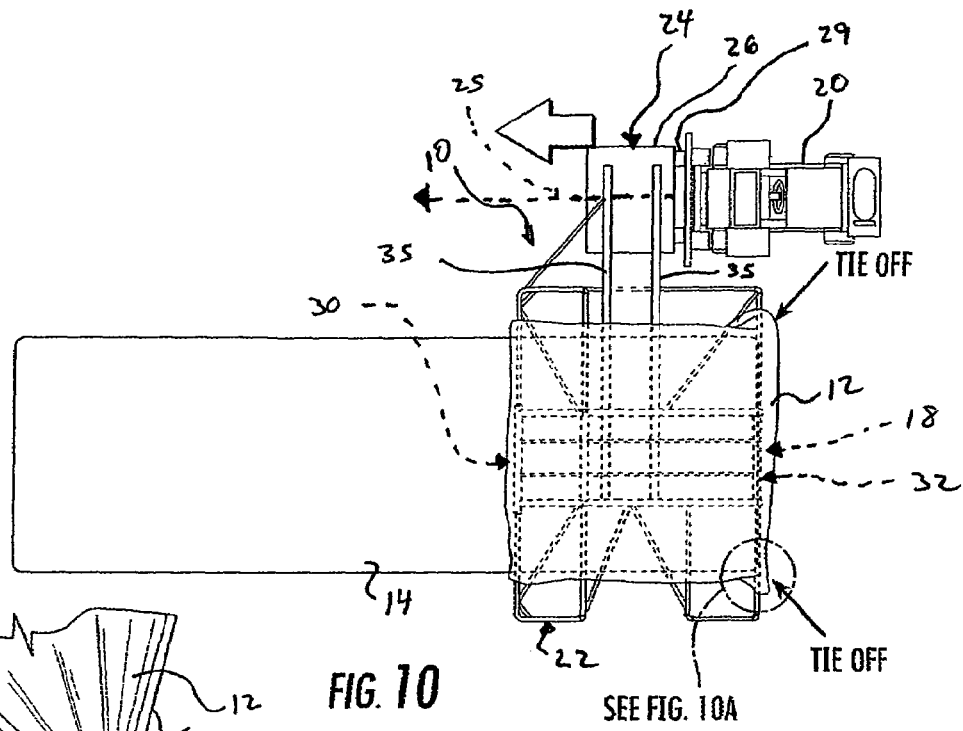
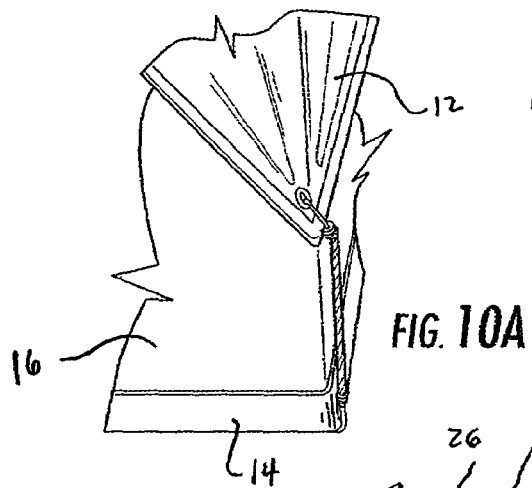
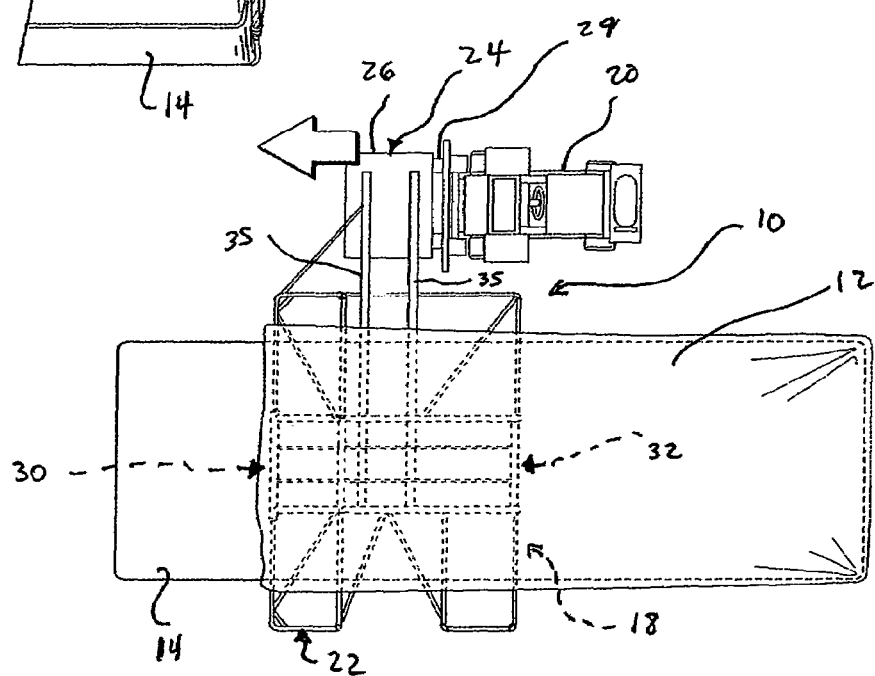

APPARATUS AND METHOD FOR POSITIONING A TARPAULIN

CROSS-REFERENCE TO RELATED APPLICATIONS

This application is a divisional of U.S. application Ser. No. 11/026,332, filed Dec. 30, 2004, now U.S. Pat. No. 7,182,387, which is hereby incorporated herein by reference.

FIELD OF THE INVENTION

The present invention is related to freight transportation and, more particularly, to an apparatus and method for positioning a tarpaulin on a flatbed to protect and secure freight.

BACKGROUND OF THE INVENTION

Materials and products are commonly transported as freight on tractor trailers, trucks, and railcars with flatbeds. In addition, it is becoming increasingly more common for retailers to use selectively located distribution centers and tractor trailers to supply adequate inventory to their stores rather than direct shipment to the stores. For example, by interconnecting stores with a network of distribution centers through a computerized retail sales system, inventory can be shipped on an as needed basis while at the same time allowing the retailer to aggregate the purchase and storage of materials and products through the distribution centers. This system enables a retailer to better manage the inventory in each of its retail stores, as opposed to having vendors restocking inventory on an adhoc basis. However, shipment of freight from the distribution centers to the retail stores on an as-needed basis oftentimes results in transporting freight that is stacked unevenly or that has uneven or incongruous shapes.

Freight is typically secured to flatbeds using various conventional means and then covered with a tarpaulin, which protects the freight against debris from the roadway, as well as rain, sleet and other ambient weather conditions. Conventionally, it has been necessary for workers to climb onto the loaded freight in order to position the tarpaulin over the freight. However, due to the height of the loaded freight on the flatbeds, it can be dangerous for workers to climb on top of the freight, as a worker could fall from the flatbed and be injured. This is particularly the case when transporting freight that is stacked unevenly or that has uneven or incongruous shapes, since it can be quite difficult for workers to move about such freight. The process of manually positioning the tarpaulin is time consuming as well.

To minimize the potential risk to workers associated with positioning the tarpaulin on freight, it is generally necessary to construct a tethering system that includes safety lines that extend from a stationary support structure to the workers while the workers are on top of the loaded freight and flatbed. Unfortunately, these tethering systems are expensive to build. In addition, because the tethering systems require a stationary support structure to secure the safety lines, it is necessary to move each flatbed that is to be covered to the tethering system, which is time consuming and increases the expense associated with loading the flatbeds.

Thus, there remains a need for an apparatus and associated method for positioning tarpaulins on trailers, trucks, and railcars with flatbeds in order to protect and secure freight. The apparatus and method should allow the tarpaulins to be efficiently and cost-effectively positioned on the flatbeds. In addition, the apparatus and method should alleviate the worker-safety issues associated with conventional positioning methods.

BRIEF SUMMARY OF THE INVENTION

The present invention provides an apparatus and associated method for positioning a tarpaulin on a flatbed. According to one embodiment, the apparatus comprises a tarpaulin positioning portion being structured to deploy the tarpaulin on the flatbed as the tarpaulin positioning portion is moved over the length of the flatbed from one end to the other. The apparatus can include a base member, wherein the tarpaulin positioning portion is attached to and extends from the base member. In one embodiment, the base member defines at least one channel on one side of the base member. In another embodiment, the tarpaulin positioning portion comprises first and second sections, wherein the first section is disposed at an obtuse angle relative to the second section. In another embodiment, the first and second sections each comprise a main portion, wherein at least one of the first and second sections comprises at least one pair of lateral portions. In yet another embodiment, the at least one pair of lateral portions has at least one rounded corner.

According to another embodiment of the present invention, the apparatus for positioning a tarpaulin on a flatbed comprises a base member having an operational axis that is oriented so as to be substantially parallel to the longitudinal axis of the flatbed when the tarpaulin is being positioned on the flatbed. The apparatus includes a tarpaulin positioning portion attached to the base member, wherein the tarpaulin positioning portion extends from the base member in a direction substantially perpendicular to the operational axis. The tarpaulin positioning portion is structured to deploy the tarpaulin on the flatbed as the tarpaulin positioning portion is moved over the length of the flatbed from one end to the other.

According to another embodiment, there is provided an apparatus for attachment to a lifting device for positioning a tarpaulin on a flatbed. The apparatus includes a base member structured to be attached to the lifting device. The apparatus further includes a tarpaulin positioning portion attached to and extending from the base member. The tarpaulin positioning portion is structured to deploy the tarpaulin on the flatbed as the tarpaulin positioning portion is moved over the length of the flatbed from one end to the other by the lifting device.

The present invention further provides a system for positioning a tarpaulin on a flatbed. According to one embodiment, the system comprises a lifting device and a tarpaulin positioning apparatus structured to be attached to the lifting device. The lifting device is structured to lift at least a portion of the tarpaulin positioning apparatus above the flatbed and to move the portion of the tarpaulin positioning apparatus over the length of the flatbed from one end to the other. The tarpaulin positioning apparatus is further structured to deploy the tarpaulin on the flatbed as the portion of the tarpaulin positioning apparatus is moved over the length of the flatbed from one end to the other by the lifting device. In one embodiment, the tarpaulin positioning apparatus includes a base member and a tarpaulin positioning portion, wherein the tarpaulin positioning portion is attached to and extends from the base member. In another embodiment, the base member defines at least one channel on one side of the base member. In another embodiment, the tarpaulin positioning portion comprises first and second sections, wherein the first section is disposed at an obtuse angle relative to the second section. In yet another embodiment, the first and second sections each comprise a main portion, wherein at least one of the first and second sections comprises at least one pair of lateral portions. In still another embodiment, the at least one pair of lateral portions has at least one rounded corner.

According to another embodiment, the system comprises a lifting device and a tarpaulin positioning apparatus. The tarpaulin positioning apparatus comprises a base member structured to be attached to the lifting device. The base member has an operational axis that is oriented so as to be substantially parallel to the longitudinal axis of the flatbed when the tarpaulin is being positioned on the flatbed. The tarpaulin positioning apparatus further comprises a tarpaulin positioning portion attached to the base member. The tarpaulin positioning portion extends from the base member in a direction perpendicular to the operational axis, wherein the lifting device is structured to lift the tarpaulin positioning portion above the flatbed and to move the tarpaulin positioning portion over the length of the flatbed from one end to the other. The tarpaulin positioning portion is structured to deploy the tarpaulin on the flatbed as the tarpaulin positioning portion is moved over the length of the flatbed from one end to the other by the lifting device.

The present invention also provides a method for positioning a tarpaulin on a flatbed. According to one embodiment of the present invention, the method comprises moving a tarpaulin positioning apparatus from a first end of the flatbed toward a second end of the flatbed to thereby deploy the tarpaulin along the length of the flatbed. In one embodiment, the tarpaulin positioning apparatus is attached to a lifting device prior to the moving step. For example, in one embodiment, a tarpaulin positioning apparatus is provided that includes a base member and a tarpaulin positioning portion, and wherein the attaching step comprises inserting a fork from the lifting device into a channel defined by the base member. In another embodiment, the tarpaulin is positioned on the tarpaulin positioning apparatus prior to the moving step. In another embodiment, the tarpaulin positioning apparatus and tarpaulin are lifted above the flatbed prior to the moving step. In yet another embodiment, a first end of the tarpaulin is secured to a first end of the flatbed prior to the moving step. In still another embodiment, a second end of the tarpaulin is secured to the second end of the flatbed subsequent to the moving step.

Thus, there is provided an apparatus and associated method for positioning tarpaulins on trailers, trucks, and railcars with flatbeds in order to protect and secure freight. The apparatus and method allows the tarpaulins to be efficiently and cost-effectively positioned on the flatbeds. In addition, the apparatus and method alleviate the worker-safety issues associated with conventional positioning methods.

BRIEF DESCRIPTION OF THE DRAWINGS

Figure 1:
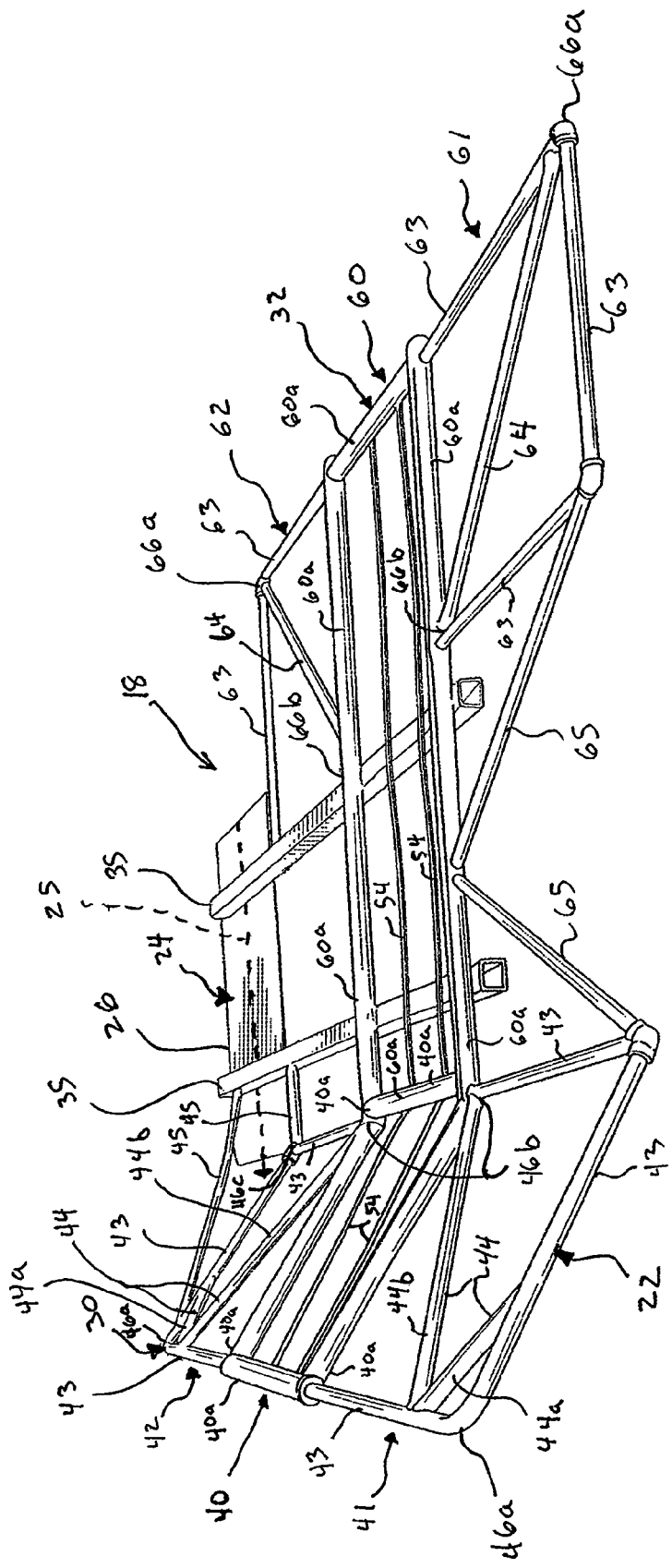
Figure 5:
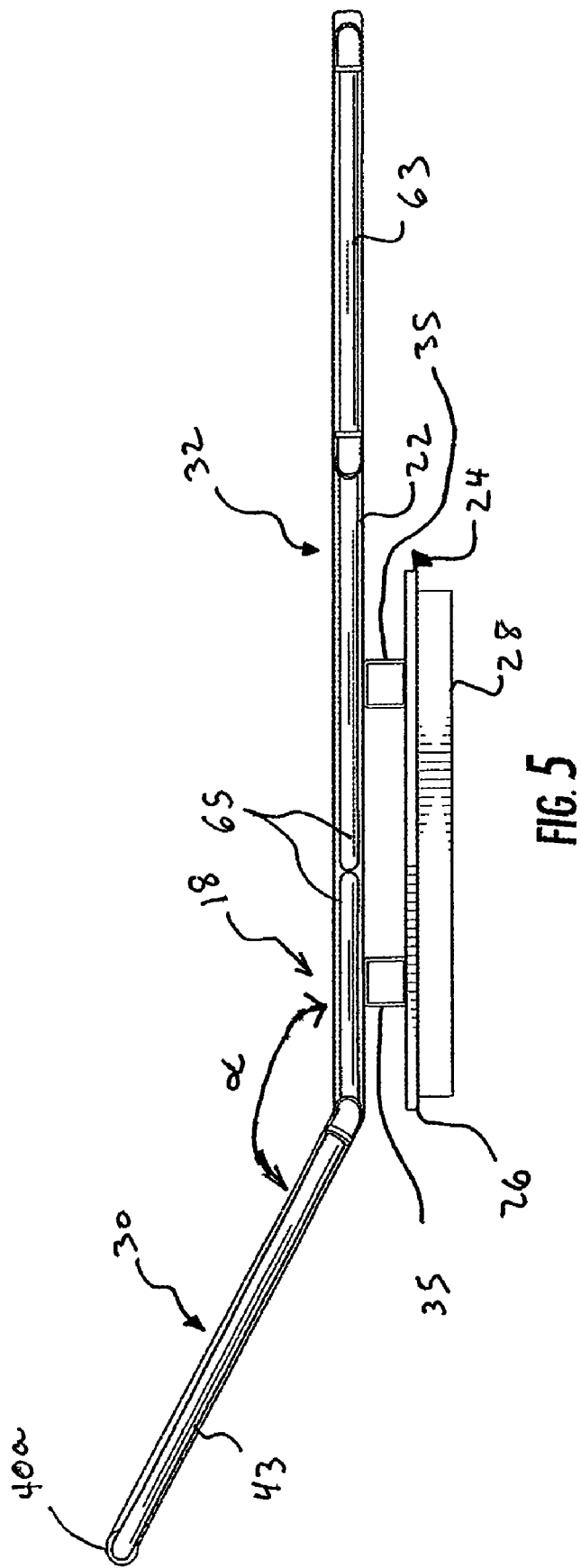
Figure 6:
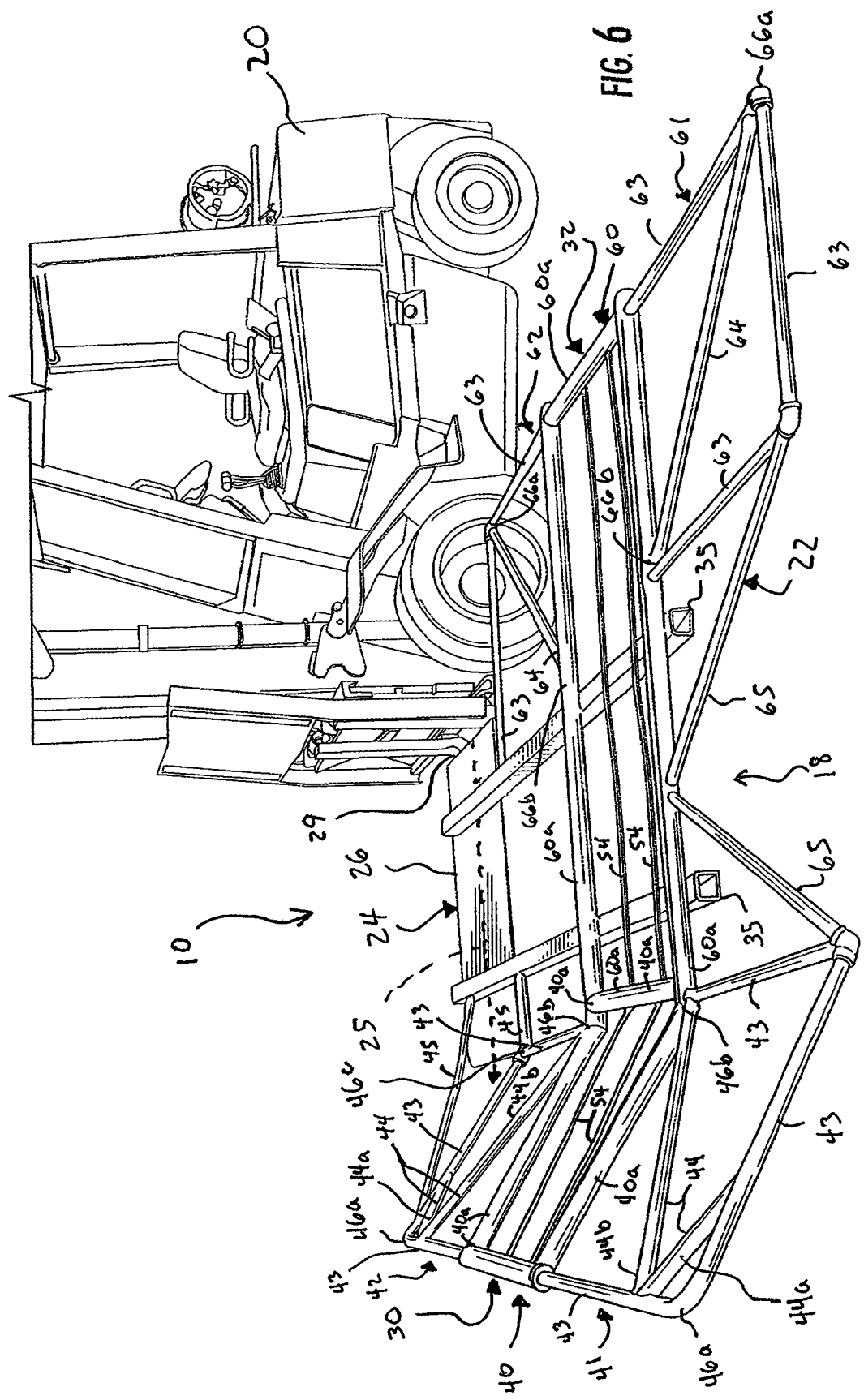
Figure 7:
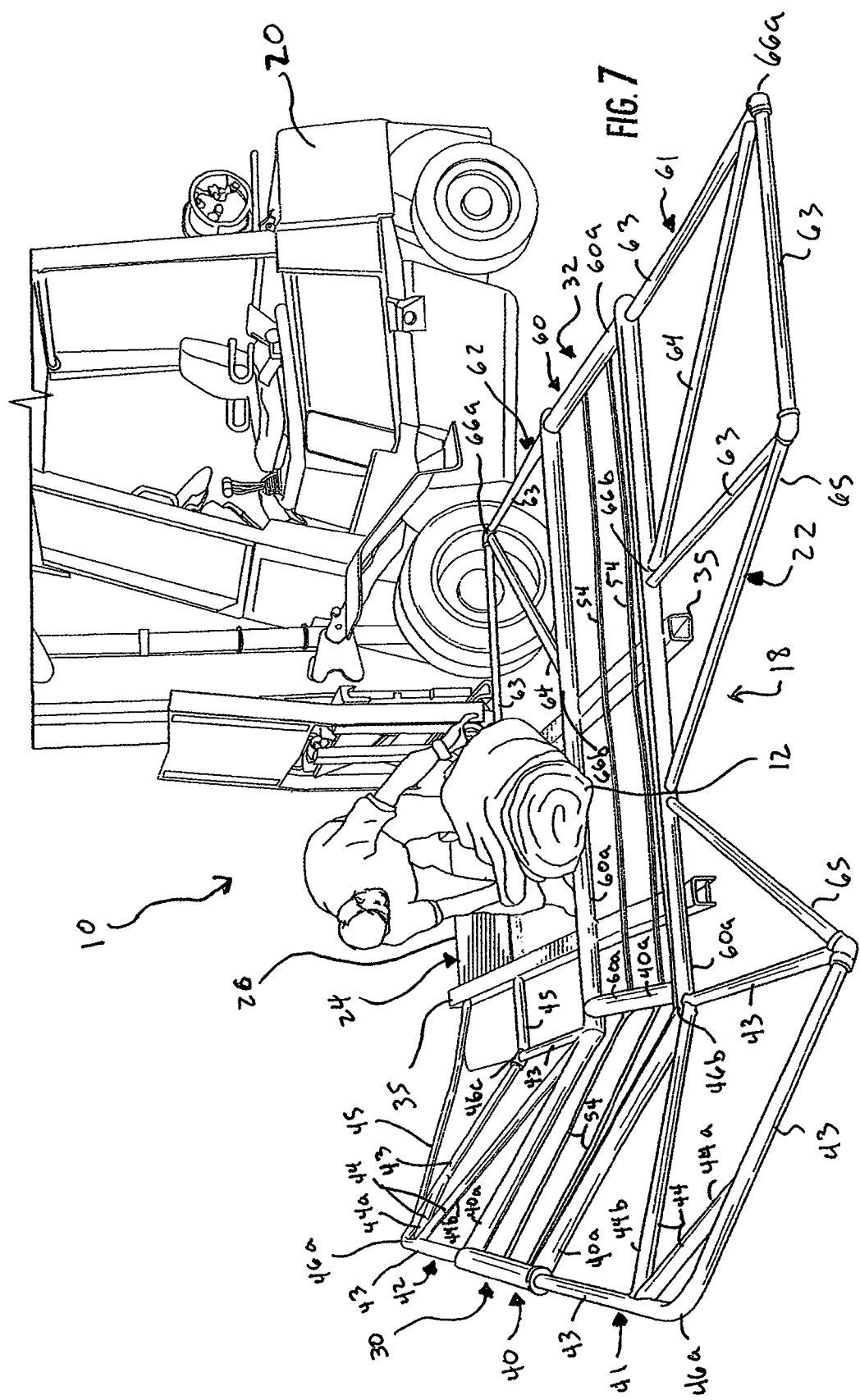
Figure 8:
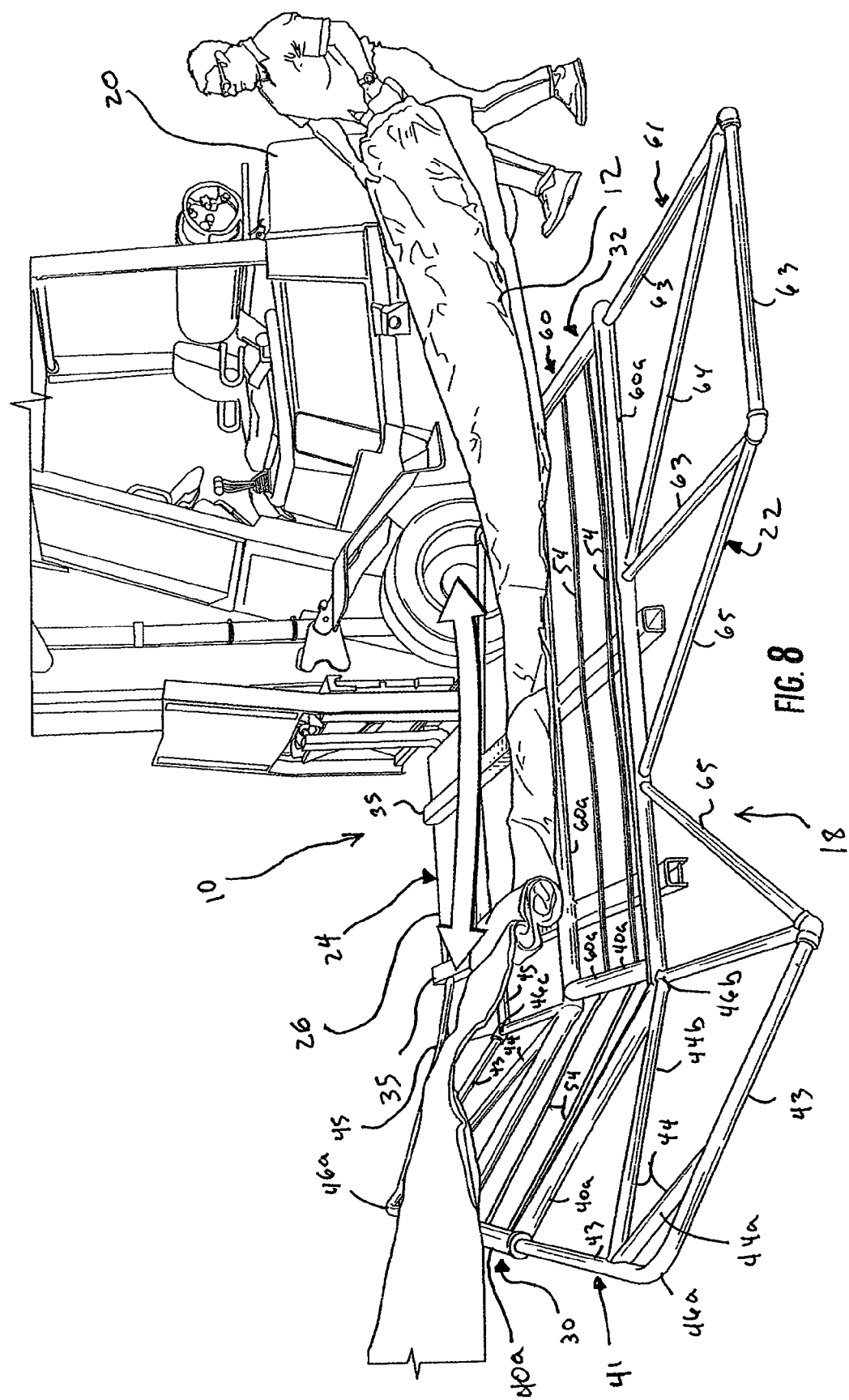
Figure 9:
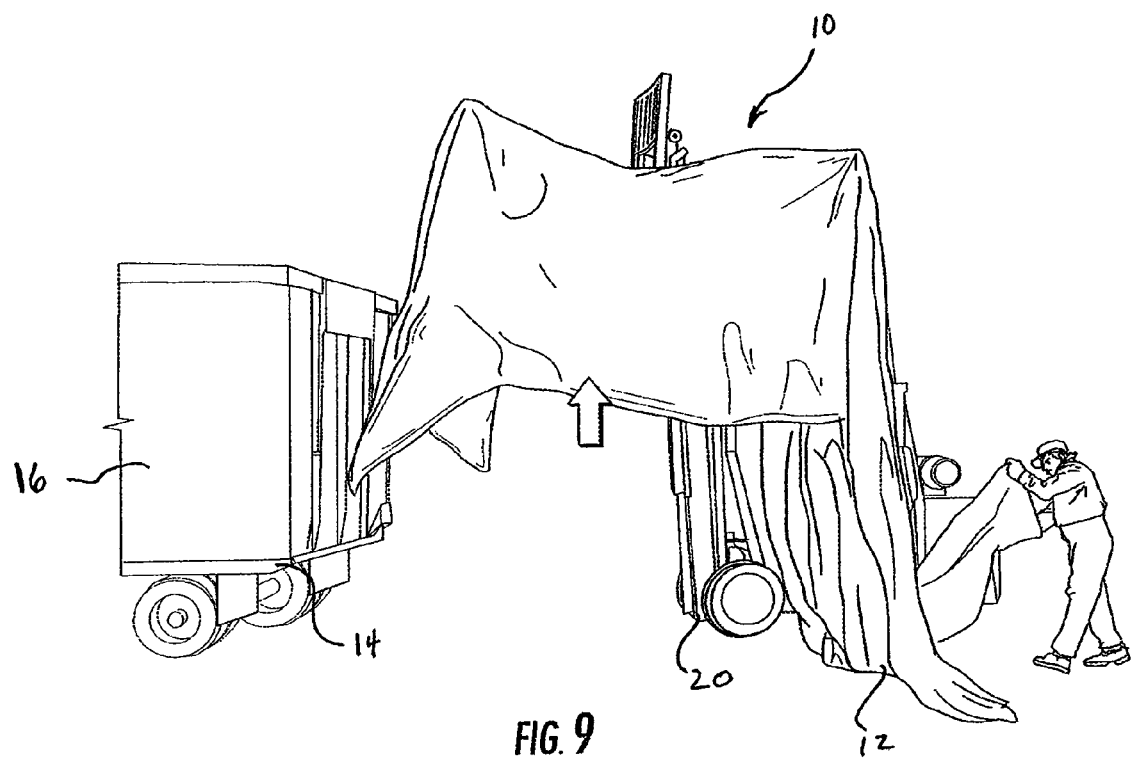
Figure 12:
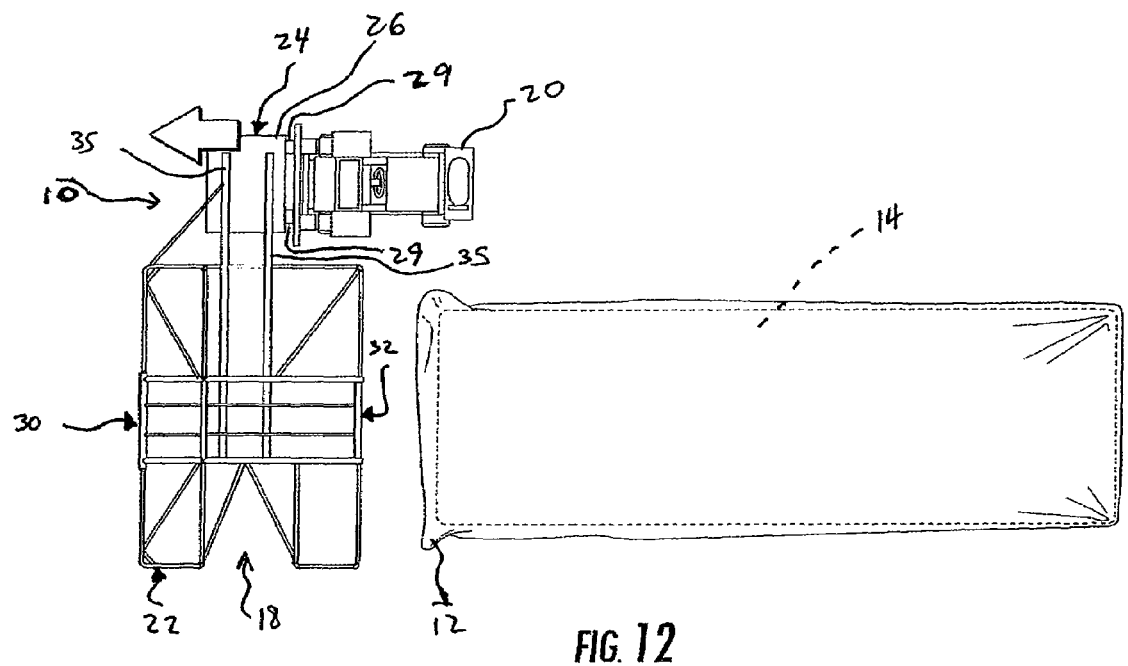
Figure 13:
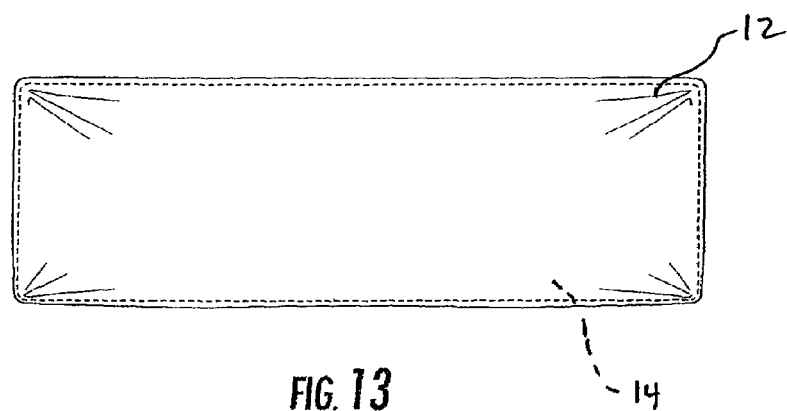

Having thus described the invention in general terms, reference will now be made to the accompanying drawings, which are not necessarily drawn to scale, and wherein:

FIG. 1 is a perspective view illustrating a tarpaulin positioning apparatus, according to one embodiment of the present invention;

FIG. 2 is a top view illustrating the tarpaulin positioning apparatus of FIG. 1;

FIG. 3 is a front view illustrating the tarpaulin positioning apparatus of FIG. 1;

FIG. 4 is a rear view illustrating the tarpaulin positioning apparatus of FIG. 1;

FIG. 5 is a side view illustrating the tarpaulin positioning apparatus of FIG. 1;

FIG. 6 is a perspective view illustrating a system for positioning a tarpaulin, according to one embodiment of the present invention;

FIG. 7 is a perspective view illustrating a tarpaulin being positioned on the tarpaulin positioning apparatus of FIG. 6;

FIG. 8 is a perspective view illustrating a tarpaulin being positioned on the tarpaulin positioning apparatus of FIG. 6;

FIG. 9 is a perspective view illustrating the tarpaulin positioning apparatus and tarpaulin of FIG. 8 being raised above a flatbed;

FIG. 10 is a top view illustrating the tarpaulin of FIG. 9 being secured to a first end of the flatbed;

FIG. 10A is a partial perspective view illustrating a corner of the tarpaulin of FIG. 10 being secured to the first end of the flatbed;

FIG. 11 is a top view illustrating the tarpaulin positioning apparatus deploying the tarpaulin of FIG. 9 as a lifting device travels along the length of the flatbed;

FIG. 12 is a top view illustrating the tarpaulin positioning apparatus, lifting device, and tarpaulin after the tarpaulin of FIG. 9 is deployed on top of the flatbed; and FIG. 13 is a top view illustrating the tarpaulin of FIG. 9 after the second end of the tarpaulin is secured to the second end of the flatbed.

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Referring to FIGS. 6 and 9, there is illustrated a system 10, according to one embodiment of the present invention, for positioning a tarpaulin 12 on a flatbed 14 to protect and secure freight 16 loaded on the flatbed. The system 10 includes a tarpaulin positioning apparatus 18 and a lifting device 20. The tarpaulin positioning apparatus 18 is structured to be attached to, and in operable communication with, the lifting device 20 and to deploy the tarpaulin 12 along the length of the flatbed 14. The lifting device 20 can include a forklift or other device capable of lifting the tarpaulin positioning apparatus 18 and tarpaulin 12 above the flatbed, as illustrated in FIG. 9, and moving the tarpaulin positioning apparatus along the length of the flatbed to deploy the tarpaulin.

According to one embodiment of the present invention, as illustrated in FIGS. 1-5, the tarpaulin positioning apparatus 18 includes a tarpaulin positioning portion 22 attached to and extending from a base member 24. The base member 24 of the tarpaulin positioning apparatus 18 is structured to be attached to the lifting device 20. For example, where the lifting device 20 comprises a forklift, the base member 24 can comprise a plate 26 having one or more channels 28 on the underside thereof. In one embodiment, as illustrated in FIG. 2, the plate 26 is formed of steel and generally has a rectangular configuration in which the width is approximately 3 feet, the length is approximately 4 feet and the thickness is approximately 3/8 inches. The channels 28 are configured to receive the forks of the forklift, as is well known by one of ordinary skill in the art. In one embodiment, as illustrated in FIGS. 3 and 4, the base member 24 includes two channels 28 formed of steel. Each channel 28 defines an opening that is approximately 2 inches by 11 inches. The channels 28 can be formed integrally with the plate 26 (such as by casting) or can be attached to the plate by welding or using suitable fasteners.

The base member 24 preferably is structured so as to provide a relatively rigid connection between the tarpaulin positioning portion 22 and the lifting device 20. The shape and dimensions of the base member 24 and the material used to form the base member can vary depending on the dimensions and weight of the tarpaulin positioning portion 22 and on the type of connection being used to connect the tarpaulin positioning apparatus 18 to the lifting device 20. For example, according to other embodiments of the present invention (not shown), the base member 24 does not include channels 28, but is secured directly to the forks of the forklift or other structure of the lifting device 20, such as by welding or using suitable fasteners. The base member 24 can be formed of metal, as discussed above, or any other material with sufficient strength to support the weight of the tarpaulin 12 and the tarpaulin positioning portion 22.

Referring to FIG. 2, the tarpaulin positioning portion 22 includes at least one support member or strut 35 extending from the base member 24 in a direction that intersects the operational axis 25 of the base member. As used herein, and as illustrated in FIGS. 6 and 10, the "operational axis" 25 of the base member 24 comprises the axis that is oriented so as to be substantially parallel to the longitudinal axis of the flatbed 14 when the tarpaulin 12 is being positioned on the flatbed (i.e., the direction of travel of the base member along the length of the flatbed). According to one embodiment, the one or more struts 35 (and, thus, the tarpaulin positioning portion 22) extend from the base member 24 in a direction that is substantially perpendicular to the operational axis 25 of the base member. In other embodiments (not shown), the degree of perpendicularity of the struts 35 and the operational axis 25 of the base member 24 can vary.

The struts 35 can be attached to the base member 24 by welding or using suitable fasteners. The struts 35 preferably are structured to provide a relatively rigid support for the tarpaulin positioning portion 22. In one embodiment, as illustrated in FIG. 2, each strut 35 is formed of steel tubing that generally has a square cross section that is approximately 3 inches by 3 inches with a wall thickness of approximately ¼ inches, and wherein the strut has a length of approximately 10 feet. The shape and dimensions of the struts 35 and the material used to form the struts can vary depending on the dimensions and weight of the tarpaulin positioning portion 22 and on the type of connection being used to connect the tarpaulin positioning apparatus 18 to the lifting device 20. For example, according to other embodiments of the present invention (not shown), the tarpaulin positioning apparatus 18 does not include a base member 24, but, instead, the one of more struts 35 of the tarpaulin positioning portion 22 are secured directly to the forks of the forklift or other structure of the lifting device 20, such as by welding or using suitable fasteners. The struts 35 can be formed of metal, as discussed above, or any other material with sufficient strength to support the weight of the tarpaulin 12 and the tarpaulin positioning portion 22.

The tarpaulin positioning portion 22 is structured to deploy the tarpaulin 12 as the tarpaulin positioning portion is moved along the length of the flatbed 14 by the lifting device 20. Referring to FIGS. 1-5, the tarpaulin positioning portion 22 comprises a first section 30 and a second section 32, wherein the first section is disposed at an angle α relative to the second section. As illustrated in FIG. 11, as the lifting device 20 moves the tarpaulin positioning portion 22 along the length of the flatbed 14, the tarpaulin 12 slides along the tarpaulin positioning portion from the first section 30 towards the second section 32 and is deployed onto the flatbed from the second section. The first section 30 of the tarpaulin positioning portion 22 is structured so as to extend in a direction at least partially opposed to the direction of motion of the tarpaulin 12 over the tarpaulin positioning portion 22 thereby creating sufficient frictional resistance or force between the forward edge of the first section and the underside of the tarpaulin to maintain the tarpaulin on the tarpaulin positioning portion except when the tarpaulin is being deployed. The frictional resistance preferably is equal to or greater than the weight of the portion of the tarpaulin 12 that extends over the edge of the second section 32 of the tarpaulin positioning portion 22 prior to deployment, as illustrated in FIG. 9. This frictional resistance is overcome as the lifting device 20 moves the tarpaulin positioning portion 22 along the length of the flatbed 14 such that the tarpaulin 12 slides along the tarpaulin positioning portion from the first section 30 towards the second section 32.

According to one embodiment, as illustrated in FIG. 5, the first section 30 is disposed at an obtuse angle α of approximately 35° relative to the second section 32. The angle between the first section 30 and the second section 32 of the tarpaulin positioning portion 22 can vary depending upon the weight of the portion of the tarpaulin 12 that extends over and is supported by the edge of the second section prior to and during deployment, as illustrated in FIG. 9, and the amount of surface area of the forward edge of the first section in contact with the tarpaulin 12. The greater the weight of the portion of the tarpaulin 12 that extends over and is supported by the edge of the second section 32 prior to deployment and/or the smaller the amount of surface area of the forward edge of the first section 30 in contact with the tarpaulin 12, then the smaller the angle α between the first and second sections. In contrast, the lesser the weight of the portion of the tarpaulin 12 that extends over and is supported by the edge of the second section 32 prior to deployment and/or the greater the amount of surface area of the forward edge of the first section 30 in contact with the tarpaulin 12, then the greater the angle α between the first and second sections.

The structure or configuration of the first section 30 and the second section 32 of the tarpaulin positioning portion 22 can vary provided the tarpaulin positioning portion has sufficient strength to support the weight of the tarpaulin 12. According to one embodiment, the first section 30 of the tarpaulin positioning portion 22 comprises a main portion 40 and first and second lateral portions 41, 42. As illustrated in FIGS. 1 and 2, the main portion 40 of the first section 30 comprises a polygonal configuration defined by four support members 40a. The support members 40a can be formed of tubular members (such as schedule 40 steel piping) having an inner diameter of approximately 2 inches and a length of approximately 36 inches. The support members 40a can be formed integrally together, or can be attached together by welding or using suitable fasteners. The configuration, dimensions, and material used to form the main portion 40 (including the arrangement of the support members 40a) can vary depending on the dimensions and weight of the tarpaulin 12 and the tarpaulin positioning portion 22, provided that the main portion is sufficiently rigid to support the tarpaulin 12 without substantial bending or other deformation during use.

Referring to FIGS. 1 and 2, the first and second lateral portions 41, 42 of the first section 30 of the tarpaulin positioning portion 22 each comprises a polygonal configuration defined by three support members 43 and one of the support members 40a of the main portion 40. The support members 43 can be formed of tubular members (such as a steel piping) having an inner diameter of approximately 1 inch and a length of approximately 27 inches. The first and second lateral portions 41, 42 may also comprise one or more interior supports 44. For example, as illustrated in FIG. 2, one interior support 44a extends between the two sides of the outer, forward corner 46a of both the first and second lateral portions 41, 42 and one interior support 44b extends from the forward support member 43 of the first and second lateral portions approximately to the interior, rear corner 46b of the first and second lateral portions adjacent the main portion 30. The interior support 44b can be formed from steel piping. The outer, forward corners 46a of the first and second lateral portions 41, 42 are preferably rounded so that the tarpaulin 12 does not snag during deployment. The second lateral portion 42 can also include one or more exterior supports 45 extending between one of the struts 35 and the exterior of the outer, forward corner 46a and the outer, rear corner 46c. The support members 43, interior supports 44, and exterior supports 45 of the first and second lateral portions 41, 42 can be formed integrally together (either in whole or in part), or can be attached by welding or using suitable fasteners. The configuration, dimensions, and material used to form the first and second lateral portions 41, 42 (including the arrangement of the support members 43, interior supports 44, and exterior supports 45) can vary depending on the dimensions and weight of the tarpaulin 12 and the tarpaulin positioning portion 22, provided the first and second lateral portions are sufficiently rigid to support the tarpaulin 12 without substantial bending or other deformation during use.

Similarly, as illustrated in FIGS. 1 and 2, the second section 32 of the tarpaulin positioning portion 22 comprises a main portion 60 and two lateral sections 61, 62. In one embodiment, the main portion 60 of the second section 32 comprises a polygonal configuration defined by four support members 60a (one of which is a support member 40a of the main portion 40 of the first section 30). As described above in connection with the main portion 40 of the first section 30, the support members 60a can be formed of tubular members (such as schedule 40 steel piping) having an inner diameter of approximately 2 inches and length of approximately 75 inches. The support members 60a can be formed integrally together, or can be attached together by welding or using suitable fasteners. In addition, the main portions 40, 60 of the first section 30 and second section 32 may also include one or more interior supports 54 extending from the forward support member 40a of the main portion 40 of the first section 30 to the rear support member 60a of the main portion 60 of the second section 32. The interior supports 54 can be attached to the support members 40a, 60a by welding or using suitable fasteners. As illustrated in FIG. 2, the side support members 60a of the main portion 60 and the interior supports 54 can be secured to the struts 35 by welding or using suitable fasteners. The configuration, dimensions, and material used to form the main portion 60 (including the arrangement of the support members 60a) can vary depending on the dimensions and weight of the tarpaulin 12 and the tarpaulin positioning portion 22, provided that the main portion is sufficiently rigid to support the tarpaulin 12 without substantial bending or other deformation during use.

Referring to FIGS. 1 and 2, the first lateral portion 61 of the second section 32 of the tarpaulin positioning portion 22 comprises a polygonal configuration defined by three support members 63 and one of the support members 60a of the main portion 60. The second lateral portions 62 of the second section 32 of the tarpaulin positioning portion 22 comprises a polygonal configuration defined by two support members 63, a portion of one of the struts 35, and one of the support members 60a of the main portion 60. The support members 63 can be formed of tubular members (such as steel piping) having an inner diameter of approximately 1 inch and a length of approximately 27 inches. The first and second lateral portions 61, 62 may also comprise one or more interior supports 64. For example, as illustrated in FIG. 2, the second lateral portion 62 includes one interior support 64 extending from the outer, rear corner 66a of the second lateral portion approximately to the interior, forward corner 66b adjacent the main portion 60. The outer, rear corners 66a of the first and second lateral portions 61, 62 are preferably rounded so that the tarpaulin 12 does not snag during deployment. The first lateral portions 41, 61 of the first section 30 and second section 32 can also include one or more exterior supports 65 extending between one of the support members 60a of the main portion 60 of the second section 32 and one of the support members 43, 63 of the corresponding first lateral portions 41, 61. The support members 63, interior supports 64, and exterior supports 65 of the first and second lateral portions 61, 62 can be formed integrally together (either in whole or in part), or can be attached by welding or using suitable fasteners. The configuration, dimensions, and material used to form the first and second lateral portions 61, 62 (including the arrangement of the support members 63, interior supports 64, and exterior supports 65) can vary depending on the dimensions and weight of the tarpaulin 12 and the tarpaulin positioning portion 22, provided the first and second lateral portions are sufficiently rigid to support the tarpaulin 12 without substantial bending or other deformation during use.

Referring to FIGS. 6-13, there are illustrated the steps for positioning a tarpaulin 12 on a flatbed 14, according to one embodiment of the present invention. As illustrated in FIG. 6, the tarpaulin positioning apparatus 18 is attached to the lifting device 20 so that the tarpaulin positioning apparatus is in operable communication with the lifting device. According to one embodiment, the forks of a forklift are inserted into corresponding channels 28 on the base member 24 of the tarpaulin positioning apparatus 18. Referring to FIGS. 7, 8 and 9, a tarpaulin 12 is positioned on the tarpaulin positioning apparatus 18. In one embodiment, the tarpaulin 12 is positioned on the tarpaulin positioning portion 22 of the tarpaulin positioning apparatus 18 so that the tarpaulin extends over the edges of the tarpaulin positioning portion. The length of tarpaulin 12 extending over the rear edge of the second section 32 of the tarpaulin positioning portion 22 is preferably greater than the length of tarpaulin extending over the forward edge of the first section 30 of the tarpaulin positioning portion.

Once the tarpaulin 12 is positioned on the tarpaulin positioning apparatus 18, the tarpaulin and tarpaulin positioning apparatus are lifted by the lifting device 20 above the flatbed 14 and freight 16 loaded on the flatbed, as illustrated in FIGS. 9 and 10. More specifically, the lifting device 20 lifts the tarpaulin 12 and tarpaulin positioning apparatus 18 to a height above the flatbed 14 and freight 16 loaded on the flatbed, as illustrated in FIG. 9, and then moves the tarpaulin and at least a portion of the tarpaulin positioning apparatus to a position above the rear of the flatbed, as illustrated in FIG. 10. In this position, the lifting device 20 is located along the side the flatbed 14. In other embodiments (not shown), the lifting device 20 can be positioned at the rear of the flatbed 14 depending on the type of lifting device being used. Referring to FIGS. 10 and 10A, a first end of the tarpaulin 12 (i.e., the end of the tarpaulin extending over the rear edge of the second section 32 of the tarpaulin positioning portion 22) is then secured to the corresponding first end of the flatbed 14. The first end of the flatbed 14 can comprise either the forward or rear end of the flatbed. According to one embodiment, as illustrated in FIG. 10A, the first end of the tarpaulin 12 is secured to the first end of the flatbed 14 using a length of rope, cable or chain, as is known in the art.

Once the first end of the tarpaulin 12 is secured to the first end of the flatbed 14, the lifting device 20 moves the tarpaulin positioning apparatus 18 from the first end of the flatbed toward the second end of the flatbed to thereby deploy the tarpaulin along the length of the flatbed, as illustrated in FIGS. 11 and 12. According to one embodiment, the lifting device 20 travels parallel to and along side of the flatbed 14, in the direction of the arrow 28 in FIG. 11. As the lifting device 20 travels in this direction, the tarpaulin 12 slides along the tarpaulin positioning portion 22 from the first section 30 to the second section 32 of the tarpaulin positioning portion and is deployed from the rear edge of the second section onto the flatbed 14 and/or freight 16 loaded on the flatbed. At the second end of the flatbed 14, the second end of the tarpaulin 12 slides off the rear edge of the second section 32 of the tarpaulin positioning portion 22, as illustrated in FIG. 12. The second end of the tarpaulin 12 may then be secured to the second end of the flatbed 14 in a manner similar to that discussed above for the first end of the tarpaulin. The tarpaulin 12 is thereby deployed and secured so that it covers the freight 16 loaded on the flatbed 14, as illustrated in FIG. 13.

As described above, the present invention provided an apparatus and associated method for positioning tarpaulins on trailers, trucks, and railcars with flatbeds in order to protect and secure freight. The apparatus and method allows the tarpaulins to be efficiently and cost-effectively positioned on the flatbeds. In addition, the apparatus and method alleviate the worker-safety issues associated with conventional positioning methods.

Many additional modifications and other embodiments of the invention will come to mind to one skilled in the art to which this invention pertains and having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of positioning a tarpaulin on a flatbed, comprising:
   providing a tarpaulin positioning apparatus, comprising:
      a base member; and
      a tarpaulin positioning portion attached to and extending from the base member, the tarpaulin positioning portion comprising first and second substantially planar sections, the first section being attached to the second section and being disposed at an obtuse angle relative to the second section;
   lifting at least a portion of the tarpaulin positioning portion above the flatbed;
   moving the portion of the tarpaulin positioning portion over the length of the flatbed from one end to the other;
   deploying the tarpaulin on the flatbed as the portion of the tarpaulin positioning portion is moved over the length of the flatbed from one end to the other.

2. A method as recited in claim 1 further comprising:
   prior to said moving step, attaching the tarpaulin positioning apparatus to a lifting device.

3. A method as recited in claim 1 further comprising:
   prior to said moving step, securing a first end of the tarpaulin to a first end of the flatbed.

4. A method as recited in claim 1 further comprising:
   subsequent to said moving step, securing a second end of the tarpaulin to the second end of the flatbed.

* * * * *